(12) United States Patent
Gratton

(10) Patent No.: US 10,760,736 B2
(45) Date of Patent: Sep. 1, 2020

(54) LUBRICATION SYSTEM AND METHOD FOR A WORK VEHICLE

(71) Applicant: Deere & Company, Moline, IL (US)

(72) Inventor: Michael R. Gratton, Asbury, IA (US)

(73) Assignee: DEERE & COMPANY, Moline, IL (US)

( * ) Notice: Subject to any disclaimer, the term of this patent is extended or adjusted under 35 U.S.C. 154(b) by 450 days.

(21) Appl. No.: 15/791,891

(22) Filed: Oct. 24, 2017

(65) Prior Publication Data

US 2019/0120424 A1     Apr. 25, 2019

(51) Int. Cl.
| | |
|---|---|
| *F16N 29/02* | (2006.01) |
| *F16N 7/36* | (2006.01) |
| *G01C 19/16* | (2006.01) |
| *E02F 9/26* | (2006.01) |
| *F16N 13/00* | (2006.01) |

(52) U.S. Cl.
CPC .............. *F16N 29/02* (2013.01); *E02F 9/265* (2013.01); *F16N 7/36* (2013.01); *G01C 19/16* (2013.01); *F16C 2326/02* (2013.01); *F16N 13/00* (2013.01)

(58) Field of Classification Search
CPC ........... F16N 29/02; G01C 19/16; E02F 9/265
USPC .............. 184/6, 6.19, 6.28, 7.2, 7.4
See application file for complete search history.

(56) References Cited

U.S. PATENT DOCUMENTS

| | | | |
|---|---|---|---|
| 5,060,760 A | 10/1991 | Long et al. | |
| 5,137,117 A | 8/1992 | Mangen et al. | |
| 5,195,612 A | 3/1993 | Hahn et al. | |
| 5,381,874 A * | 1/1995 | Hadank | F16N 29/02 184/6 |
| 5,482,138 A * | 1/1996 | Mori | E02F 9/00 184/6 |
| 5,823,295 A | 10/1998 | Griffith et al. | |
| 5,839,213 A * | 11/1998 | Abbott | E02F 9/00 37/443 |
| 7,134,323 B1 | 11/2006 | Discenzo | |
| 8,387,755 B2 | 3/2013 | Marek | |
| 8,464,837 B2 | 6/2013 | Algulin et al. | |
| 8,509,999 B2 * | 8/2013 | Suzuki | E02F 9/24 701/50 |

(Continued)

FOREIGN PATENT DOCUMENTS

| | | |
|---|---|---|
| JP | 04351400 A | 12/1992 |
| JP | H0614252 A | 2/1994 |
| JP | 2011162944 A | 8/2011 |

OTHER PUBLICATIONS

"Graco Automatic Lubrication Systems." Graco, 2008. Online product brochure. Retrieved Apr. 3, 2017. Retrieved from: <http://www.westernintech.com/assets/Graco%20Automatic%20Lubrication%20Systems%20Brochure%20339427A.pdf>.

*Primary Examiner* — Michael R Mansen
*Assistant Examiner* — Mark K Buse

(57) ABSTRACT

A work vehicle having a joint, a joint sensor, a lubricant reservoir, a pump, and a controller. The joint has a first member connected to a second member by a bearing. The joint sensor is configured to provide a joint signal indicative of at least one of a position, velocity, and acceleration of the joint. The pump is configured to dispense lubricant from the lubricant reservoir to the bearing when actuated. The controller receives the joint signal, determines a cumulative bearing travel based on the joint signal, determines a bearing lubrication value based on the cumulative bearing travel, and actuates the pump based on the bearing lubrication value.

17 Claims, 3 Drawing Sheets

(56) References Cited

U.S. PATENT DOCUMENTS

| | | | |
|---|---|---|---|
| 9,119,354 B2 | 9/2015 | Stevenson et al. | |
| 9,133,983 B2 | 9/2015 | Kettunen et al. | |
| 9,169,970 B2 | 10/2015 | Gillespie et al. | |
| 9,643,310 B2 | 5/2017 | Moore | |
| 10,017,919 B2* | 7/2018 | Nomura | E02F 9/2054 |
| 10,024,494 B2* | 7/2018 | Busch | F16N 29/02 |
| 2011/0301781 A1* | 12/2011 | Karlsson | E02F 9/26 |
| | | | 701/1 |
| 2013/0228398 A1* | 9/2013 | Voelz | F01M 7/00 |
| | | | 184/6 |
| 2014/0034420 A1 | 2/2014 | Frelich et al. | |
| 2016/0024757 A1* | 1/2016 | Nomura | E02F 3/435 |
| | | | 414/687 |
| 2019/0218753 A1* | 7/2019 | Morimoto | E02F 3/34 |

* cited by examiner

LUBRICATION SYSTEM AND METHOD FOR A WORK VEHICLE

TECHNICAL FIELD

The present disclosure generally relates to a system and method for lubricating bearings on a work vehicle.

BACKGROUND

Work vehicles often comprise multiple joints where a bearing is used to permit relative movement across the joint. These bearings can require a lubricant to be applied regularly in order for the bearing to achieve its desired performance or life. A person may regularly lubricate these bearings in order to keep the bearings properly lubricated, for example at scheduled intervals.

Work vehicles may be equipped with automatic lubrication systems which regularly lubricate multiple bearings, with the goal of reducing the manual effort required for proper lubrication maintenance. These automatic lubrication systems may lubricate the bearings at predetermined time intervals during the operation of the work vehicle, or based on a sensed flow or pressure of the lubricant supplied.

SUMMARY

Various aspects of examples of the present disclosure are set out in the claims.

According to a first aspect of the present disclosure, a work vehicle may include a joint, a joint sensor, a lubricant reservoir, a pump, and a controller. The joint may include a first member connected to a second member by a bearing. The joint sensor may be configured to provide a joint signal indicative of at least one of a position, velocity, and acceleration of the joint. The pump may be configured to dispense lubricant from the lubricant reservoir to the bearing when the pump is actuated. The controller may be in communication with the joint sensor and the pump, and configured to receive the joint signal, determine a cumulative bearing travel based on the joint signal, determine a bearing lubrication value based on the cumulative bearing travel, and actuate the pump based on the bearing lubrication value.

According to a second aspect of the present disclosure, a joint of a work vehicle may be lubricated by receiving a joint signal from a joint sensor, determining a cumulative bearing travel based on the joint signal, determining a bearing lubrication value based on the cumulative bearing travel, and actuating a pump based on the bearing lubrication value.

According to a third aspect of the present disclosure, a work vehicle may include a chassis, work implement, linkage, joint sensor, lubricant reservoir, pump, and controller. The linkage may movably connect the work implement to the chassis and include a joint which includes a bearing. The joint sensor may be configured to provide a joint signal indicative of an angular position of the joint. The pump may be configured to dispense lubricant from the lubricant reservoir to the bearing when the pump is actuated. The controller may be in communication with the joint sensor and the pump, and configured to receive the joint signal, determine a cumulative bearing travel based on the joint signal, and actuate the pump based on the cumulative bearing travel.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
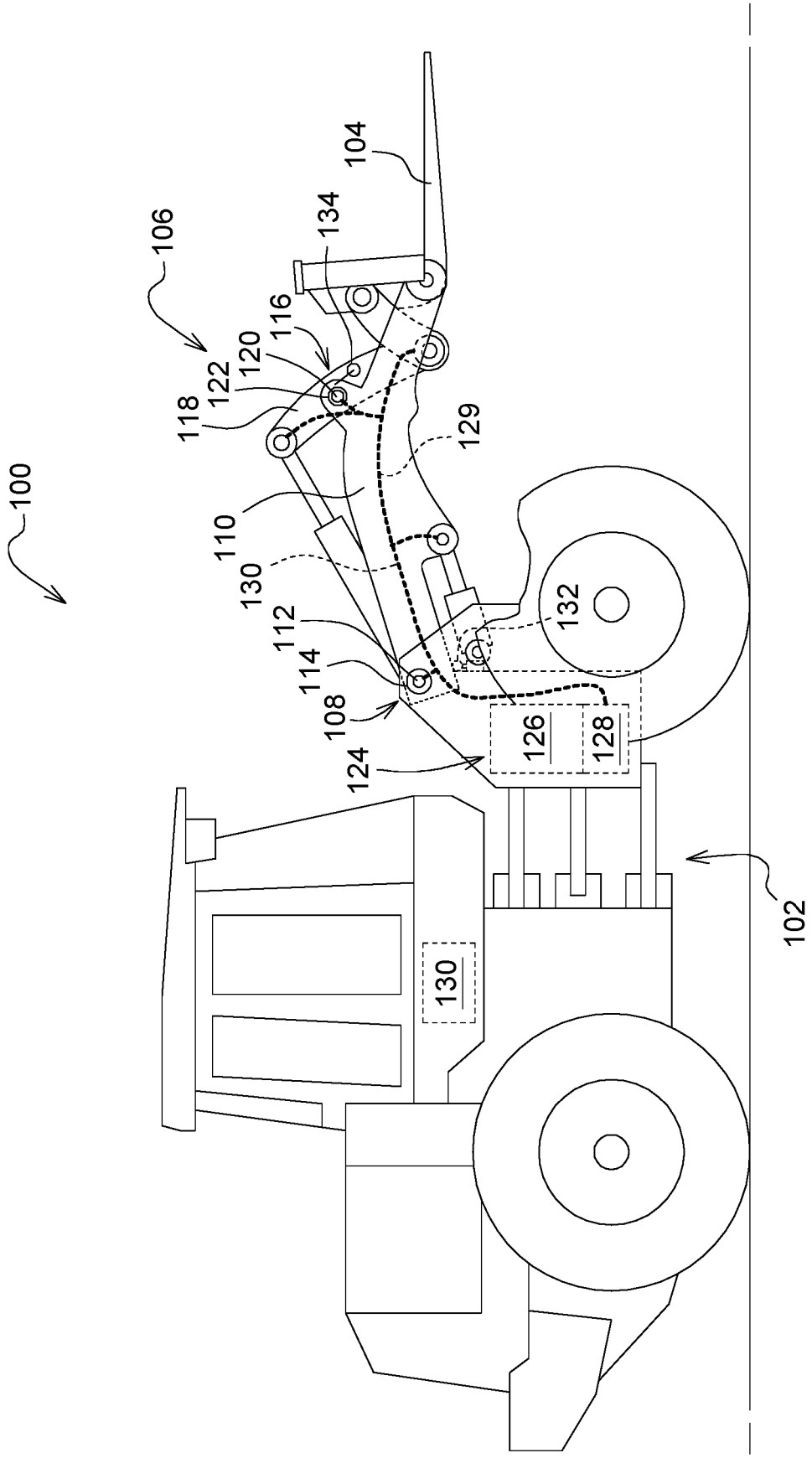
FIG. 1 is a right side view of a work vehicle with a lubrication system.
Figure 2:
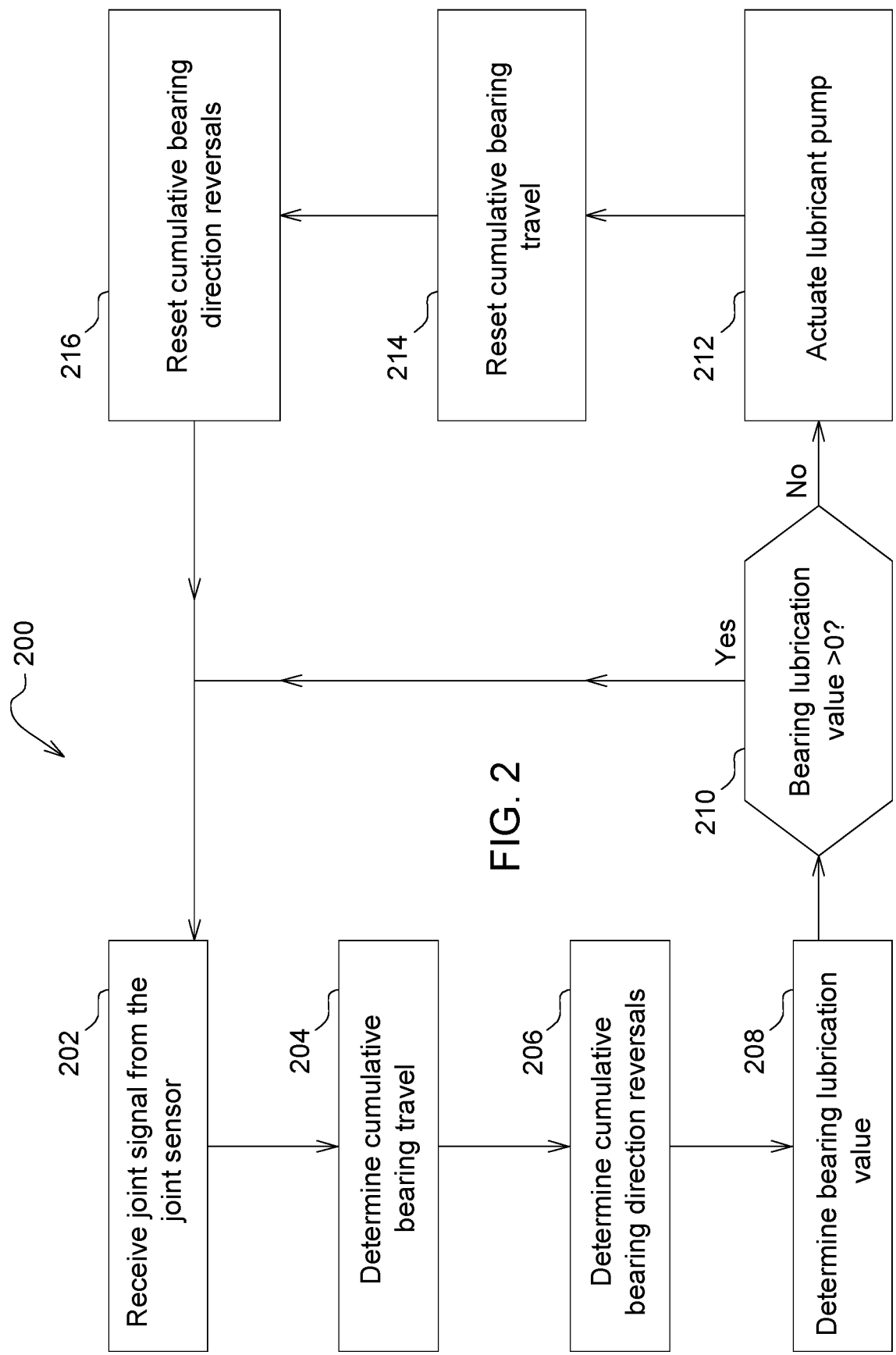
FIG. 2 is a flow chart of a first control system for the lubrication system.
Figure 3:
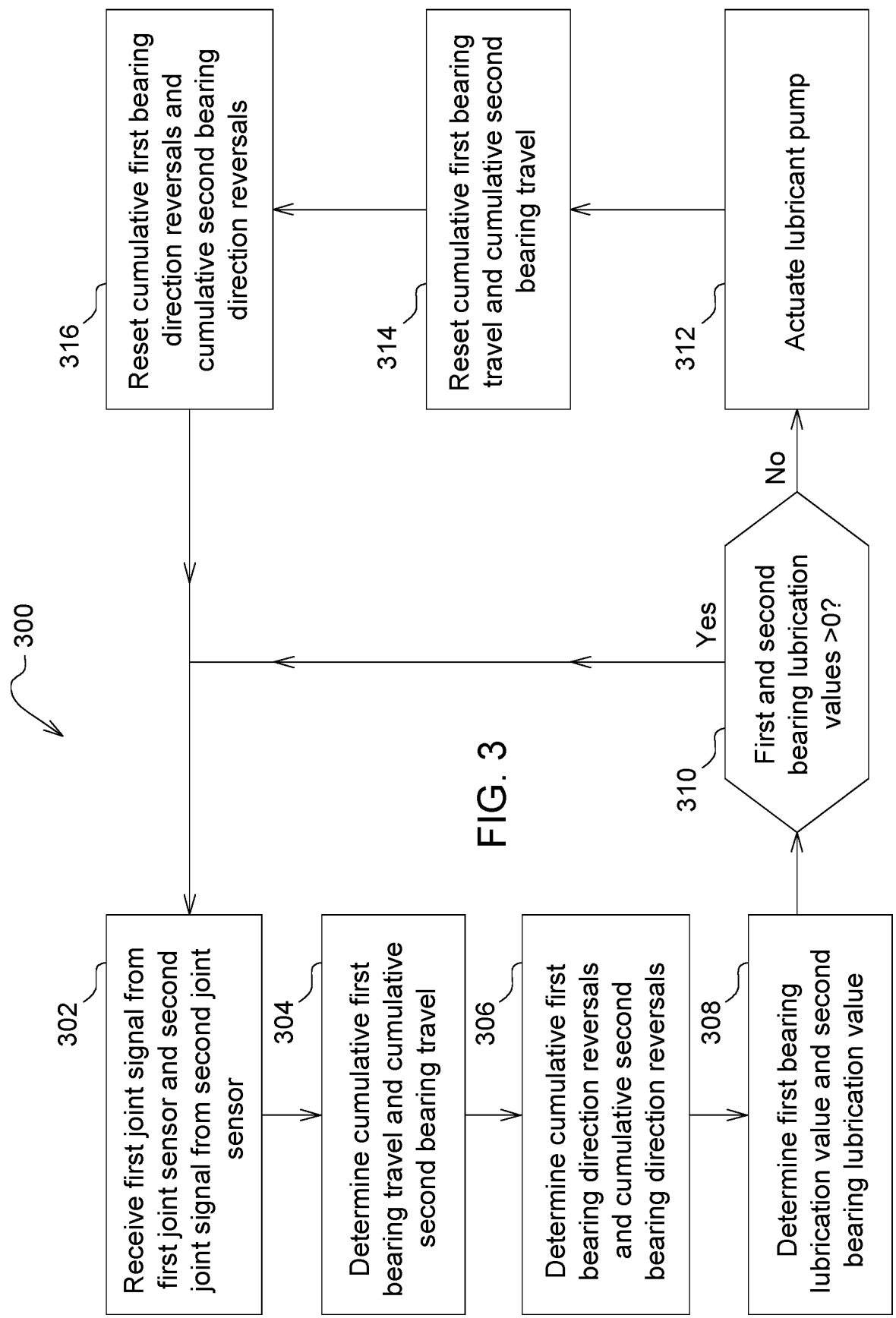
FIG. 3 is a flow chart of a second control system for the lubrication system.

At least one example embodiment of the subject matter of this disclosure is understood by referring to FIGS. 1 through 3 of the drawings.

FIG. 1 depicts a work vehicle 100, which is illustrated as a four-wheel drive loader but which could be any of a number of other work vehicles, such as an articulated dump truck, backhoe loader, compact track loader, crawler (e.g., crawler dozer, crawler loader), excavator, feller buncher, forwarder, harvester, knuckleboom loader, motor grader, scraper, skidder, skid steer, and telehandler. The work vehicle 100 comprises a chassis 102 to which a work implement 104 (e.g., forks, a bucket) is movably connected by a linkage 106. The linkage 106 is a multiple-member linkage which enables the height and orientation of implement 104 to be adjusted relative to the chassis 102.

The movable connection between the chassis 102 and the work implement 104 includes multiple joints interconnecting multiple members. A first joint 108 connects the chassis 102 to a boom 110 via a first pin 112 received by a first bearing 114. A second joint 116 connects the boom 110 to a bellcrank 118 via a second pin 120 received by a second bearing 122. Each of the first joint 108 and the second joint 116 form pivotal connections, allowing relative pivotal motion between the members they connect. A number of other similar joints are present throughout the remainder of the linkage 106.

The first bearing 114 is a bushing which allows for a pivotal connection between the chassis 102 and the boom 110 through sliding contact with the first pin 112. The second bearing 122 is a bushing which allows for a pivotal connection between the boom 110 and the bellcrank 118 through sliding contact with the second pin 120. Although the first bearing 114 and the second bearing 122 are each illustrated as bushings in the embodiment shown in FIG. 1, in alternate embodiments such bearings may be any of a number of different bearing types, including other types of sliding bearings or rolling bearings. Further, while these bearings are illustrated in a linkage in FIG. 1, in alternate embodiments such bearings may be in other joints of a work vehicle besides the linkage, such as an articulation joint for the work vehicle.

Lubrication is provided for the first bearing 114, the second bearing 122, and other bearings of the linkage 106 by the lubricant dispensing system 124. The lubricant dispensing system 124 comprises a lubricant reservoir 126, a lubricant pump 128, and lubricant lines 129. The lubricant reservoir 126 may be filled with a bearing lubricant (e.g., greases, such as those made with lithium or calcium soaps). The lubricant pump 128 draws lubricant from the lubricant reservoir 126 and pumps it out through the lubricant lines 129 to dispense it into the bearings of the linkage 106. Although the lubricant distribution system of the work vehicle 100 is simplified for purposes of illustration in FIG. 1, the lubricant pump 128 may supply lubricant to a distribution block, and an individual lubricant line for each bearing may be connected to this distribution block. Multiple distribution blocks may be used to create a branching system of lubricant lines, and valves may be included to enable the lubricant pump 128 to control how lubricant is dispensed to the bearings. As one example, adjustable valves may be utilized which modify the flow resistance to individual bearings, thereby enabling adjustments to be made to control the amount of lubricant flowing to one bearing relative to another bearing. As another example, movable valves may be utilized to enable the lubricant pump 128 to dispense lubricant to less than all the bearings at once, enabling the flow and timing of lubrication to be varied by individual bearing or by a group of bearings.

The lubricant dispensing system 124 may be controlled by a controller 130. As used herein, "controller" is intended to be used consistent with how the term is used by a person of skill in the art, and refers to a computing component with processing, memory, and communication capabilities which is utilized to control or communicate with one or more other components. In the embodiment illustrated in FIG. 1, the controller 130 is a standalone controller dedicated to controlling the lubricant dispensing system 124, but in alternate embodiments the controller 130 may be a vehicle control unit (VCU) which controls multiple functions of the work vehicle 100 in addition to the lubricant dispensing system 124. The controller 130 controls the lubricant dispensing system 124 by selectively actuating the lubricant pump 128. The controller 130 may do this through a direct electrical connection through which it powers the lubricant pump 128, or through intermediate components such as by sending a command or otherwise actuating one or more components which in turn actuate the lubricant pump 128, such as relays, switches, clutches, or other controllers. The controller 130 may be configured so as to control the lubricant dispensing system 124 based on a control system and sensor input, as described further below with reference to FIG. 2 and FIG. 3.

In addition to the lubricant pump 128, the controller 130 is also in communication with a first joint sensor 132 and a second joint sensor 134. The first joint sensor 132 is a rotary position sensor which has portions connected to both the chassis 102 and the boom 110, enabling it to sense the angular position of the boom 110 relative to the chassis 102. The first joint sensor 132 is therefore configured to provide a joint signal to the controller 130 which is indicative of an angular position of the boom 110 (i.e., the angular position of the boom 110 relative to the chassis 102) and therefore indicative of the angular position of the first bearing 114 (i.e., the angular position of the bushing relative to the first pin 112). The second joint sensor 134 is also a rotary position sensor, and has portions connected to both the bellcrank 118 and the boom 110, enabling it to sense the angular position of the bellcrank 118 relative to the boom 110. The second joint sensor 134 is therefore configured to provide a second joint signal to the controller 130 which is indicative of an angular position of the bellcrank 118 (i.e., the angular position of the bellcrank 118 relative to the boom 110) and therefore indicative of the angular position of the second bearing 122 (i.e., the angular position of the bushing relative to the second pin 120). Both the first joint sensor 132 and the second joint sensor 134 are rotary position sensors, which may also be known as absolute angular position sensors or angular encoders, but in alternate embodiments different sensor types may be utilized, including linear displacement sensors, accelerometers, and gyroscopes, among other types. These alternate sensor types and alternate sensing arrangements may enable the direct sensing of the relative position, velocity, or acceleration of one member to another member, or the absolute position, velocity, or acceleration of a member, or may enable such sensing indirectly by providing inputs which may be processed further to find the position, velocity, or acceleration of a member. The position, velocity, or acceleration measured directly or indirectly by the sensors may also be linear or angular, depending on the nature of the joint.

FIG. 2 is a flow chart of a control system 200 which the controller 130 may be configured to execute in order to control the lubrication applied to a bearing. The control system 200 is to manage the actuation of the lubricant pump 128 to keep the first bearing 114 lubricated during operation of the linkage 106 of the work vehicle 100. In step 202, the controller 130 receives a joint signal from the first joint sensor 132 indicative of the angle of the boom 110 relative to the chassis 102, and thus indicative of the angle of the first bearing 114. In this embodiment, the first joint sensor 132 is a Hall Effect rotary sensor which provides the joint signal as a voltage signal in the range of 0.5-4.5 volts, a voltage range which corresponds to an angle range for the rotary sensor. The first joint sensor 132 is packaged with its body portion mechanically fixed to the chassis 102 and its rotary potion connected via a cam-follower arm arrangement to the underside of the boom 110 so as to rotate with the boom 110. Alternate embodiments may utilize different sensor types, for example other absolute rotary sensors such as optical sensors or magneto-resistive sensors, rotary sensors that are not absolute and instead provide a signal or count each time a partial revolution occurs, or linear displacement sensors such as capacitive or inductive sensors.

In step 204, the controller 130 determines the cumulative bearing travel for the first bearing 114 based on the joint signal received in step 202. This is determined by taking the last value for cumulative bearing travel and then adding whatever travel has occurred since the last value was last calculated to arrive at the cumulative bearing travel. The travel which has occurred since the last value was calculated is determined based on the joint signal received in step 202 from the first joint sensor 132. As an example, if the controller 130 stored a value of 7003.12 rotations for the cumulative bearing travel during the last cycle of the control system 200 when the first joint sensor 132 indicated a joint position of 10 degrees, and in step 202 it received the joint signal from the first joint sensor 132 indicating a joint position of 13.6 degrees or of 6.4 degrees, the cumulative bearing travel would be determined to be 7003.13 rotations in step 204, as movement in either direction would indicate that 0.01 rotations of travel had been experienced by the first bearing 114. By increasing the value regardless of the direction of rotation, the cumulative bearing travel is indicative of the total travel experienced by the first bearing 114 rather than the net travel it has experienced. In this example, the cumulative bearing travel is measured as a cumulative angular travel in rotations, but in alternate embodiments it may be measured in other angular, linear, or linear equivalent units. As an example of the usage of linear units, in an alternate embodiment with a linear bearing, such as the sliding bearing used for the blade of a motor grader, the cumulative bearing travel may be measured in a linear unit such as meters or kilometers.

As an example of linear equivalent units, the controller 130 may determine the cumulative bearing travel for a bearing subject to non-linear motion (such as the rotational motion experienced by the first bearing 114) in terms of a cumulative linear travel equivalent for the bearing, which is the equivalent linear distance of relative motion which has occurred between the load-bearing interface surfaces of a bearing. If the interface surface for the first bearing 114

(where the pin and bushing interface) has a diameter of 0.2 meters, the cumulative linear travel equivalent for the first bearing 114 can be calculated by taking the product of the rotations experienced by the bearing, 0.2, and π. Multiplying rotations by π and the diameter of the load-bearing interface surfaces translates the rotations of the bearing into the equivalent linear distance of relative motion experienced by the load-bearing interface surfaces. Whether tracking the bearing's rotations or the equivalent linear travel distance of the bearing's load-bearing interface surfaces is more associated with the lubrication needs of a bearing may depend on the application in which the control system 200 is applied.

In step 206, the controller 130 determines the cumulative bearing direction reversals for the first bearing 114 based on the joint signal received in step 202. This is determined by taking the last value for the cumulative bearing direction reversals and incrementing it if the bearing has changed directions since the last value was determined. For example, if the controller 130 has a stored value of 15020 for the cumulative bearing direction reversals, and the joint signal it receives from the first joint sensor 132 indicated a joint position of 20 degrees, 22 degrees, 23 degrees, and 21 degrees during the last four measurements by the controller 130, then the controller 130 determines the cumulative bearing direction reversals to be 15021.

Just as with the cumulative linear travel equivalent for a bearing, the cumulative bearing direction reversals is an optional step which may be included if it is found to improve the estimation of the lubrication needs for a bearing in a particular application. In alternate embodiments, determination and usage of the cumulative bearing direction reversals may not be done if it is not found to improve the estimations of lubrication needs or if the improvements are not found to warrant the additional complexity to the control system 200. In those alternate embodiments, step 206 would not be performed and step 208 would not be based on the cumulative bearing direction reversals.

In step 208, the controller 130 determines the bearing lubrication value based on the cumulative bearing travel determined in step 204 and the cumulative bearing direction reversals determined in step 206. For example, the bearing lubrication value may be calculated by taking a constant (e.g., 2000000) and decreasing it by the cumulative bearing travel determined in step 204 and the cumulative bearing direction reversals determined in step 206. As another example, the cumulative bearing travel and cumulative bearing direction reversals may each be multiplied by a factor before being subtracted from a constant. As another example, an alternate algorithm may be utilized to take the cumulative bearing travel and the cumulative bearing direction reversals and arrive at the bearing lubrication value.

The control system 200 determines the bearing lubrication value in step 208 directly based on the cumulative bearing travel and the cumulative bearing direction reversals, and thus indirectly based on the joint signal from the first joint sensor 132, but alternate embodiments may perform these determinations differently. As one example, instead of individually tracking the cumulative bearing travel and the cumulative bearing direction reversals, the control system could store just a bearing lubrication value and then decrease that value by an appropriate amount in each instance that bearing travel is detected or a bearing direction reversal is detected. In this way, cumulative bearing travel is not stored as a separate value but it is determined and used during the determination of the bearing lubrication value and the lubricant pump 128 is actuated based on it.

In step 210, the controller 130 compares the bearing lubrication value determined in step 208 to zero. If the bearing lubrication value is greater than zero, the control system 200 proceeds to step 202 and thereby forms a loop comprising step 202, step 204, step 206, step 208, and step 210 until sufficient bearing travel or direction reversals have occurred to bring the bearing lubrication value to less than or equal to zero. Once the bearing lubrication value is found to be less than or equal to zero in step 210, the control system 200 proceeds to step 212.

Although step 208 and step 210 in this embodiment utilize a bearing lubrication value that decrease with increases in the cumulative bearing travel and the cumulative bearing direction reversals, it would be equivalent to implement an alternate control system in which a value is increased with increases in the cumulative bearing travel and the cumulative bearing direction reversals. As an example of such an alternate control system, such a bearing lubrication degradation value may be based on the cumulative bearing travel and the cumulative bearing direction reversals, and in step 210, such an alternate control system may loop back to step 202 until the bearing lubrication degradation value rises above a threshold, at which point it would proceed to step 212.

In step 212, the controller 130 actuates the lubricant pump 128 for a period of time by providing it with electrical current, which causes the lubricant pump 128 to draw lubricant from the lubricant reservoir 126 and pump it through the lubricant lines 129 to dispense it to the first bearing 114 to replenish and refresh the lubricant in the first bearing 114. This period of time may vary depending on the application to which the control system 200 is applied. The control system 200 may remain on step 212 until the period of time is complete, or may proceed to step 214 in parallel while the pump actuation takes place.

In step 214, the controller 130 resets the cumulative bearing travel to a value of zero, then in step 216, the controller 130 resets the cumulative bearing direction reversals to zero before proceeding back to step 202. Setting these two values to zero allows the determinations in step 204 and step 206 to track the cumulative bearing travel and the cumulative bearing direction reversals since the last actuation of the lubricant pump 128, and therefore allows the bearing lubrication value to be determined in step 208 based on these values since the last actuation. In alternate embodiments, the cumulative bearing travel and the cumulative bearing direction reversals may never be reset to zero and may instead keep increasing over the life of the control system 200 or the first bearing 114, which may be of value in certain applications. In such alternate embodiments, step 214 and step 216 are not executed and the calculations in step 204, step 206, and/or step 208 are changed so that the bearing lubrication value is calculated based on the cumulative bearing travel and the cumulative bearing direction reversals since the last actuation of the lubricant pump 128, rather than the lifetime cumulative bearing travel or lifetime cumulative bearing direction reversals.

FIG. 3 is a flow chart of a control system 300 which the controller 130 may be configured to execute in order to control the lubrication applied to two different bearings. The control system 300 is to manage the actuation of the lubricant pump 128 to keep the first bearing 114 and the second bearing 122 lubricated during operation of the linkage 106 of the work vehicle 100. In step 302, the controller 130 receives the first joint signal from the first joint sensor 132 indicative of the angle of the boom 110 relative to the chassis 102, and thus indicative of the angle of the first bearing 114, and receives the second joint signal from the second joint sensor 134 indicative of the angle of the bellcrank 118 relative to the boom 110, and thus indicative of the angle of the second bearing 122.

In step 304, the controller 130 determines a cumulative first bearing travel for the first bearing 114 based on the first joint signal received in step 302. In a similar manner, the controller 130 also determines a cumulative second bearing travel for the second bearing 122 based on the second joint signal received in step 302.

In step 306, the controller 130 determines cumulative first bearing direction reversals for the first bearing 114 based on the first joint signal received in step 302. In a similar manner, the controller 130 determines cumulative second bearing direction reversals for the second bearing 122 based on the second joint signal received in step 302.

In step 308, the controller 130 determines a first bearing lubrication value for the first bearing 114 based on the cumulative first bearing travel determined in step 304 and the cumulative first bearing direction reversals determined in step 306. In a similar manner, the controller 130 determine a second bearing lubrication value for the second bearing 122 based on the cumulative second bearing travel determined in step 304 and the cumulative second bearing direction reversals determined in step 306.

In step 310, the controller 130 compares the first bearing lubrication value and the second bearing lubrication value determined in step 308 to zero. If both values are greater than zero, the control system 300 proceeds to step 302 and thereby forms a loop comprising step 302, step 304, step 306, step 308, and step 310 until sufficient bearing travel or direction reversals have occurred for either the first bearing 114 or the second bearing 122 to bring either of the first bearing lubrication value or the second bearing lubrication value equal to or less than zero. Once either bearing lubrication value is found to be equal to or less than zero, the control system 300 proceeds to step 312.

In step 312, the controller 130 actuates the lubricant pump 128 for a period of time in order to dispense lubricant to the first bearing 114 and the second bearing 122. In step 314, the controller 130 resets each of the cumulative first bearing travel and the cumulative second bearing travel to zero. In step 316, the controller 130 resets each of the cumulative first bearing direction reversals and the cumulative second bearing direction reversals to zero, then proceeds back to step 202.

For the sake of brevity, conventional techniques and arrangements related to signal processing, data transmission, signaling, control, and other aspects of the systems disclosed herein may not be described in detail. Furthermore, the connecting lines shown in the various figures contained herein are intended to represent example relationships and/or connections between the various elements (e.g., electrical power connections, communications, physical couplings). It should be noted that many alternative or additional relationships or connections may be present in an embodiment of the present disclosure.

Without in any way limiting the scope, interpretation, or application of the claims appearing below, a technical effect of one or more of the example embodiments disclosed herein is the lubrication of bearings in a movable joint based on the expected depletion or degradation of lubricant within that joint, and determining that expected depletion or degradation by determining the total travel of the bearing by measuring the position, velocity, or acceleration of the joint. This may reduce instances in which the bearing is operating with less than an optimal amount or quality of lubricant and may also reduce the instances in which lubricant is wasted due to being over-applied to the bearing, both of which may occur when automatic lubrication systems are set to lubricate at certain time intervals or a certain numbers of cycles. Further, for certain applications, it may not be easy to define a cycle or track operating time (versus idle time, for example), or the lubrication needs of the bearing may not track the cycles or operating time with an accuracy sufficient to control a lubrication system. This may also avoid the need for the complexity and cost associated with sensors and control systems that lubricate based on a sensed flow, pressure, or presence of lubricant.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A work vehicle comprising:
   a joint comprising a first member connected to a second member by a bearing;
   a joint sensor configured to provide a joint signal, the joint signal indicative of at least one of a position, velocity, and acceleration of the joint;
   a lubricant reservoir;
   a pump configured to dispense lubricant from the lubricant reservoir to the bearing when the pump is actuated; and
   a controller in communication with the joint sensor and the pump, the controller configured to:
   receive the joint signal;
   determine a cumulative bearing travel based on the joint signal;
   determine a cumulative bearing direction reversals based on the joint signal;
   determine a bearing lubrication value based on both the cumulative bearing travel and the cumulative bearing direction reversals; and
   actuate the pump based on the bearing lubrication value.

2. The work vehicle of claim 1, wherein the joint signal is indicative of an angular position of the joint and the cumulative bearing travel is indicative of a cumulative angular travel for the bearing.

3. The work vehicle of claim 1, wherein the joint signal is indicative of an angular position of the joint and the cumulative bearing travel is indicative of a cumulative linear travel equivalent for the bearing.

4. The work vehicle of claim 1, wherein the bearing lubrication value is decreased as the cumulative bearing travel increases, and the controller is further configured to actuate the pump when the bearing lubrication value falls below a threshold.

5. The work vehicle of claim 1, wherein the joint is a first joint, the bearing is a first bearing, the joint sensor is a first joint sensor, the joint signal is a first joint signal, the cumulative bearing travel is a cumulative first bearing travel, and the bearing lubrication value is a first bearing lubrication value, the work vehicle further comprising:

a second joint comprising a third member connected to a fourth member by a second bearing;

a second joint sensor configured to provide a second joint signal, the second joint signal indicative of at least one of a position, velocity, and acceleration of the second joint;

wherein:
the pump is configured to dispense lubricant from the lubricant reservoir to the first bearing and the second bearing when actuated; and
the controller is further configured to:
receive the second joint signal;
determine a cumulative second bearing travel based on the second joint signal;
determine a second bearing lubrication value based on the cumulative second bearing travel; and
actuate the pump based on both the first bearing lubrication value and the second bearing lubrication value.

6. A method of lubricating a joint of a work vehicle, the joint comprising a first member connected to a second member by a bearing, the method comprising:
receiving a joint signal from a joint sensor, the joint signal indicative of at least one of a position, velocity, and acceleration of the joint of the work vehicle;
determining a cumulative bearing travel based on the joint signal;
determining a cumulative bearing direction reversals based on the joint signal;
determining a bearing lubrication value based on both the cumulative bearing travel and the cumulative bearing direction reversals; and
actuating a pump based on the bearing lubrication value, the pump configured to dispense lubricant from a lubricant reservoir to the bearing when actuated.

7. The method of claim 6, wherein the joint signal is indicative of an angular position of the joint and the cumulative bearing travel is indicative of a cumulative angular travel for the bearing.

8. The method of claim 6, wherein the joint signal is indicative of an angular position of the joint and the cumulative bearing travel is indicative of a cumulative linear travel equivalent for the bearing.

9. The method of claim 6, further comprising:
decreasing the bearing lubrication value based on an increase in the cumulative bearing travel; and
actuating the pump when the bearing lubrication value falls below a threshold.

10. The method of claim 6, wherein the joint is a first joint, the bearing is a first bearing, the joint sensor is a first joint sensor, the joint signal is a first joint signal, the cumulative bearing travel is a cumulative first bearing travel, and the bearing lubrication value is a first bearing lubrication value, the method further comprising:
receiving a second joint signal from a second joint sensor, the second joint signal indicative of at least one of a position, velocity, and acceleration of a second joint of the work vehicle;
determining a cumulative second bearing travel based on the second joint signal;
determining a second bearing lubrication value based on the cumulative second bearing travel; and
actuating the pump based on the first bearing lubrication value and the second bearing lubrication value, the pump configured to dispense lubricant from the lubricant reservoir to the first bearing and the second bearing when actuated.

11. The method of claim 10, further comprising:
decreasing the first bearing lubrication value based on an increase in the cumulative first bearing travel;
decreasing the second bearing lubrication value based on an increase in the cumulative second bearing travel; and
actuating the pump based on the lesser of the first bearing lubrication value and the second bearing lubrication value falling below a threshold.

12. A work vehicle comprising:
a chassis;
a work implement;
a linkage movably connecting the work implement to the chassis, the linkage comprising a joint, the joint comprising a bearing;
a joint sensor configured to provide a joint signal, the joint signal indicative of an angular position of the joint;
a lubricant reservoir;
a pump configured to dispense lubricant from the lubricant reservoir to the bearing when the pump is actuated; and
a controller in communication with the joint sensor and the pump, the controller configured to:
receive the joint signal;
determine a cumulative bearing travel based on the joint signal;
determine a cumulative bearing direction reversals based on the joint signal; and
actuate the pump based on both the cumulative bearing travel and the cumulative bearing direction reversals.

13. The work vehicle of claim 12, wherein the cumulative bearing travel is indicative of a cumulative angular travel for the bearing.

14. The work vehicle of claim 12, wherein the cumulative bearing travel is indicative of a cumulative linear travel equivalent for the bearing.

15. The work vehicle of claim 12, wherein the controller is further configured to actuate the pump based on both the cumulative bearing travel and the cumulative bearing direction reversals which occurred since the previous actuation of the pump.

16. The work vehicle of claim 12, where the controller is further configured to:
determine a bearing lubrication value based on both the cumulative bearing travel and the cumulative bearing direction reversals;
decrease the bearing lubrication value based on an increase in the cumulative bearing travel;
decrease the bearing lubrication value based on an increase in the cumulative bearing reversals; and
actuate the pump based on the bearing lubrication value.

17. The work vehicle of claim 12, wherein the joint is a first joint, the bearing is a first bearing, the joint sensor is a first joint sensor, the joint signal is a first joint signal, and the cumulative bearing travel is a cumulative first bearing travel, the work vehicle further comprising:
a second joint included in the linkage, the second joint comprising a second bearing;
a second joint sensor configured to provide a second joint signal, the second joint signal indicative of an angular position of the second joint;
wherein the controller is further configured to:
receive the second joint signal;
determine a cumulative second bearing travel based on the second joint signal; and actuate the pump based on both the cumulative first bearing travel and the cumulative second bearing travel.

\* \* \* \* \*